United States Patent [19]
Nakajima et al.

[11] Patent Number: 5,893,691
[45] Date of Patent: Apr. 13, 1999

[54] MACHINE TOOL

[75] Inventors: Seiji Nakajima, Numazu; Masahito Shiozaki, Shizuoka-ken, both of Japan

[73] Assignee: Toshiba Kikai Kabushiki Kaisha, Tokyo, Japan

[21] Appl. No.: 08/871,968

[22] Filed: Jun. 10, 1997

[30] Foreign Application Priority Data

Jun. 11, 1996 [JP] Japan .................................... 8-149104

[51] Int. Cl.⁶ .................................................. B23D 7/00
[52] U.S. Cl. ......................... 409/235; 408/91; 408/234; 409/145
[58] Field of Search ............................ 409/235, 228, 409/145, 231; 408/234, 91, 124

[56] References Cited

U.S. PATENT DOCUMENTS

| | | | |
|---|---|---|---|
| 527,952 | 10/1894 | Elder | 409/145 |
| 559,822 | 5/1896 | Spencer | 409/145 |
| 1,174,665 | 3/1916 | Briggs | 409/228 |
| 2,870,660 | 1/1959 | Chausson | 408/91 |
| 2,912,905 | 11/1959 | Berthiez | 90/16 |
| 3,152,650 | 10/1964 | Savidge | 408/234 |
| 3,800,636 | 4/1974 | Zagar | 82/32 |
| 4,364,696 | 12/1982 | Syarto | 409/145 |
| 4,569,627 | 2/1986 | Simunovic | 408/234 |
| 4,640,651 | 2/1987 | Runyon | 409/145 |
| 5,028,180 | 7/1991 | Sheldon et al. | 409/145 |
| 5,152,645 | 10/1992 | Corsi | 409/235 |
| 5,507,605 | 4/1996 | Bae | 408/91 |

FOREIGN PATENT DOCUMENTS

| | | | |
|---|---|---|---|
| 0 054 836 | 6/1982 | European Pat. Off. | |
| 1 288 129 | 8/1962 | France | |
| 1 566 042 | 5/1969 | France | |
| 24 61 948 | 7/1976 | Germany | |
| 29 04 973 | 8/1980 | Germany | |
| 917927 | 4/1982 | Sweden | 408/124 |
| 1757786 | 8/1992 | Sweden | 409/235 |
| 491 707 | 6/1970 | Switzerland | |

OTHER PUBLICATIONS

European Search Report for EP 97 30 4010.

*Primary Examiner*—Andrea L. Pitts
*Assistant Examiner*—Adesh Bmargava
*Attorney, Agent, or Firm*—Finnegan, Henderson, Farabow, Garrett & Dunner, L.L.P.

[57] ABSTRACT

In a machine tool provided with a column 4 mounted on a back end portion of a bed 1 having a table 2, and a spindle head 20 arranged in a vertically movable manner to the column 4, both sides of an upper portion of the column 4 is connected with both sides of a front-end portion of the bed 1 through support members 42, 43. Even the machine has a structure that the spindle head 20 embeds a main shaft rotating at high rpm, vibration can be reduced. The column is affected by a force to fall down in the direction due to the weight of the spindle head 20, but the tilt caused by the force can be avoided. Accordingly, a high finish surface accuracy can be ensured without an increase in size and weight.

15 Claims, 3 Drawing Sheets

MACHINE TOOL

BACKGROUND OF THE INVENTION

1. Field of the Invention

The present invention relates to machine tools processing metallic materials. In detail, the invention relates to a machine tool having a bed with a table, a column provided on the bed, and a spindle head provided on the column.

2. Description of the Related Art

Nowadays, a machine tool having a bed with a table, a column mounted at the back portion of the bed and a spindle head provided on the column (column type machine tool), the bed and the column are made in high stiffness so that the accuracy in vertical motion of the spindle head and in rotational motion of the main shaft supported by the spindle head can be ensured.

Meanwhile, recently in metal processing, when the main shaft is supported in a rotatable manner with air bearing and the main shaft is rotated at a speed of several thousand revolution per minute (for instance, fifty to seventy thousand rpm.), it is recognized that a high-efficiency processing in the feed speed for cutting at several meter per minute can be achieved.

When such a high speed rotation spindle head is applied on a column type machine tool, there arises a problem that high finish surface accuracy can not be ensured due to vibration caused by the high rotation of the main shaft.

In order to solve the problem, the bed and the column can be constructed in higher stiffness, but it is not practical because it is still insufficient and results in an increase in size and weight of the whole machine.

It is an object of the present invention to solve the problem and to provide a machine tool to ensure a high finish surface accuracy without an increase in size or weight.

SUMMARY OF THE INVENTION

In a machine tool having a bed with a table, a column mounted on a first end portion of the bed, a spindle head provided on the column, the machine tool according to the present invention features that an upper portion of the column is connected with a second end portion which is on the other side of the first end portion of the bed using a support.

According to the structure above described, as the upper portion of the column is connected with the second end portion (the end portion on the opposite side of the end portion on which the column is mounted) by means of the support, vibration can be reduced even when the spindle head embeds a main shaft rotating at high rpm. And the column is affected by a force to fall dawn toward the direction of the force due to the weight of the spindle head but the construction above described prevents the tilt caused by the force. Accordingly, high finish surface accuracy can be ensured without an increase in size and weight.

The spindle head may be structured with a main shaft supported in a rotatable manner by an anti-friction bearing. But a more suitable structure for processing such as a metal dies is to have the main shaft supported in a rotatable manner by an air bearing because the main shaft can be rotated at higher rpm. Further more, vibration and noise can be also reduced even when the main shaft is rotating at high rpm so that a high finish surface accuracy can be obtained as the above described effect.

As a structure of supporting the main shaft in a rotatable manner with an air bearing, the spindle head is provided with a housing supported by a column, a main shaft supported in a rotatable manner by an air bearing in the housing and having a flange on some midpoint of the main shaft, and a motor to rotate the main shaft. And the air bearing may be provided with a radial bearing having air outlets jetting out air toward an outer peripheral surface of the main shaft and a thrust bearing having air outlets jetting out air toward the flange of the main shaft.

Further more, it is preferable that the support is constructed including a pair of support members connecting both sides of the upper portion of the column supporting the spindle head with both sides of the second end portion (an end portion on the opposite side of the end portion on which the column is mounted).

Thus constructed, both sides of the upper portion of the column are supported by a pair of support members so that the strength of the structure can be improved.

It is preferable that a space between the pair of the support members is shaped to become wider from both sides of the upper portion of the column supporting the spindle head toward both sides of the second end portion on the bed.

Then, an operator can work more comfortably because a working space is widely secured for the operator who brings work on the table or carries out work from the table.

More specifically, the pair of the support members may be horizontally extended in a manner separating away from each other from both sides of the upper portion of the column supporting the spindle head toward the second end portion of the bed, then further horizontally extended in parallel with each other from each front-end toward the second end portion of the bed and are finally fixed at right angles on both sides of the second end portion of the bed.

It does not matter what kind of material should be used for the support member but use of a hollow-body pipe would lighten the whole weight.

When the table is arranged in a movable manner along two directions which are intersecting at right angles with each other on a horizontal surface and the spindle head is arranged in a movable manner along a vertical direction intersecting at right angles with the moving direction of the table, so even difficult jobs can be achieved quite easily because the work on the table and tools on the main shaft of the spindle can be three dimensionally moved to each other.

On one side of the support member can be provided with an indicator for giving positions in the operation of the table in two directions and a position in the operation of the spindle head in vertical directions. Then the need and expense of providing an extra column to hold the indicator can be eliminated.

Moreover, when the indicator is arranged in such a manner that orientation of a display surface of the indicator can be changed so that the indicator does not interfere with the operator's activities for carrying in and taking out of his work, and the display of the indicator can be moved at many angles so that the positions of the table in the operation in both directions and the position of the spindle head in the vertical direction are easily checked.

On both sides of the second end portion on the bed, support portions to support lower ends of the pair of the support members can be provided and a notched concavity portion can be formed on a space between the support portions.

Thus formed, when works are brought onto the table or taken out from the table, an operator can easily work because of being able to enter into the notched concavity portion to come near the table side.

DETAILED DESCRIPTION OF THE PREFERRED EMBODIMENT(S)

An embodiment of the present invention will now be explained in detail with reference to the drawings.

Figure 1:
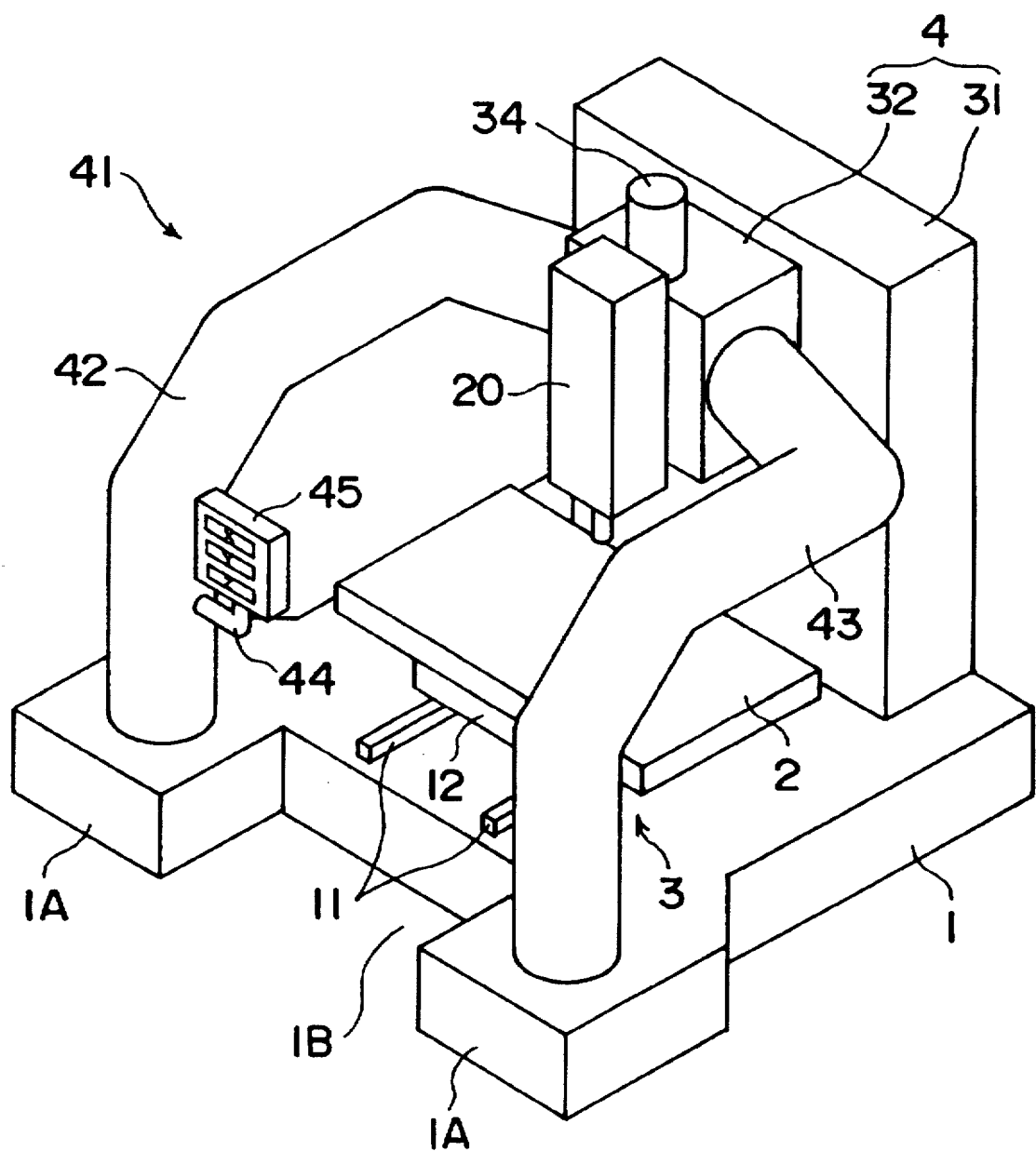
FIG. 1 is a perspective view showing an outward appearance of an embodiment of the present invention.
Figure 2:
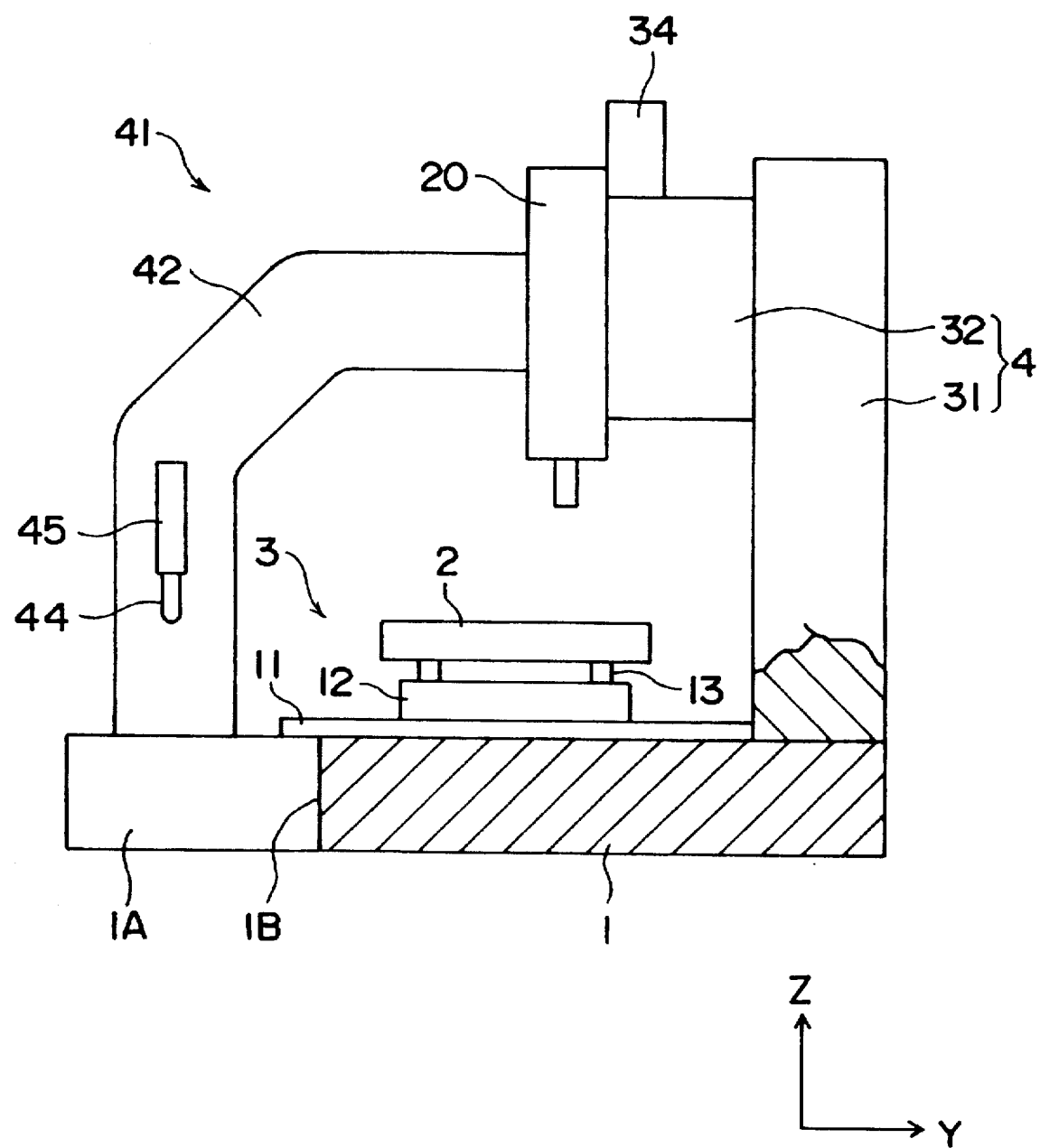
FIG. 2 is a sectional view of the above embodiment.

FIG. 1 is a perspective view of an outward appearance of a vertical type machining center according to the present invention and FIG. 2 is a sectional view of the machining center.

As shown in these figures, a bed 1 is provided with a table 2 on the surface thereof in a movable manner in the right and left directions (X direction) and back and forth directions (Y direction) through a driving mechanism. And a column 4 is mounted on a back end portion (a first end portion).

The driving mechanism 3 is structured with a pair of guide rails 11 provided on the bed in parallel with the Y direction, a Y slider 12 provided in a movable manner in the Y direction on the guide rail, and a pair of guide rails 13 provided on the Y slider 12 in parallel along the X direction and supports the table 2 in a movable manner to the X direction. In addition to these, though not shown in the figures, a feeding mechanism is provided to move the Y slider to Y direction and the table 2 to the X direction.

The column 4 is structured including a perpendicular column member 31 vertically mounted on a back end portion of the bed 1 and a horizontal column member 32 integrally fixed on the front surface of an upper portion of the vertical column member 31. The horizontal column 32 is provided with a spindle head 20 in a vertically movable manner (movable in Z direction) to the table 2 and is also provided with a Z shaft driving mechanism 34 to move the spindle head 20 up and down.

Figure 3:
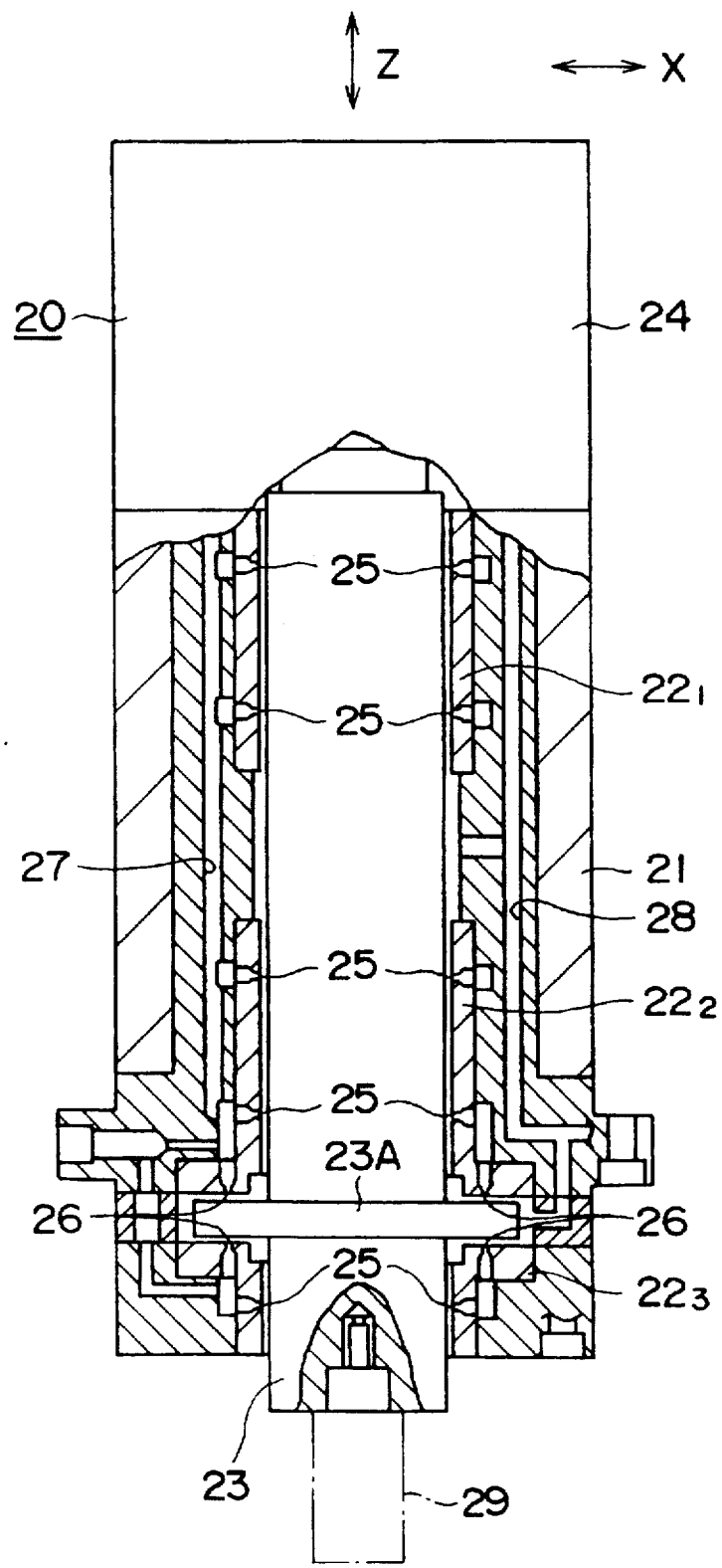
FIG. 3 is a sectional view of a spindle head in the above embodiment.

The spindle head 20 is, as shown in FIG. 3, provided with a housing 21 arranged on the horizontal column member 32 in a vertically movable manner and moved up and down by the Z shaft driving mechanism 34, a main shaft 23 supported and embedded in a rotatable manner and in parallel with Z direction by the housing 21 through an air bearing $22_1$, $22_2$, $22_3$ and having a flange 23A at some midpoint of the main shaft 23, and a motor 24 to rotate the main shaft 23.

In each surface of inner radius of the air bearing $22_1$, $22_2$, $22_3$, plural air outlets 25 which jet out air from a direction intersecting at right angles to the main shaft 23 are formed. Thus, a radial bearing is formed to support the main shaft 23 along a radial direction by air jetted from the air outlets 25. And plural air outlets 26 which jet air to a flange 23A of the main shaft 23 are provided on confronting faces at each end face of the air bearing $22_2$, $22_3$ along the shaft. A thrust bearing to support the main shaft 23 along the thrust direction is formed by air jetted from these air outlets 26. Incidentally, 27 is an air supply channel to supply high-pressure air to each air outlet 25, 28 is an exhaust channel, and 29 is a tool in FIG. 3.

An upper portion of the column 4 and a front end portion of the bed 1 (a second end portion on the opposite side of a first end portion) are related to by a support 41. The support 41 connects both sides of the upper portion of the column 4 with both sides of the front end portion of the bed 1 and is composed of a pair of hollow cylindrical support members 42, 43 (such as a pipe) of which mutual distance gradually becomes wider from both sides of the upper portion of the column 4 to both sides of the front portion of the bed.

More specifically, the pair of the support members 42 and 43 are horizontally extended in a manner separating away from each other from both sides of the horizontal column 32 which supports the spindle head 20 toward the front-end portion of the bed 1, further horizontally extended in parallel with each other from each front-end toward the front end portion of the bed 1, then after further extension in a slanting downward direction, are fixed at right angles on the both front end portion of the bed.

An arm 44 is mounted on a front perpendicular portion of the one side of the support members and a display board 45 as an indicator showing the positions of the table 2 in the X and Y directions and the position of the spindle head in the z direction is attached on the arm 44 in such a manner that the display board can freely turn so that the orientation of the surface of the display board can be changed. Supporting members 1A, 1A to support lower ends of the pair of the support members 42, 43 are formed on the both sides of the front-end portion of the bed 1 supporting the lower ends of the support members 42, 43, and a trapezoidal notched concavity portion 1B is formed between the support portions 1A, 1A.

Effects of the embodiment will be now explained.

In processing, after the work is set on the table 2, the work is processed with the tool 29 attached to the main shaft 23, while the table 2 is moving to the X and Y directions by means of the driving mechanism 3 and the spindle head 20 is moving to the Z direction by means of the Z shaft driving mechanism 34.

At this time, as an upper portion of the column 4 (the horizontal column member 32) is connected to both sides of the front-end portion of the bed 1 through the support member 42, 43, vibration can be reduced even when the spindle head 20 is moved to the Z direction by means of the Z shaft driving mechanism or the main shaft 23 is rotated at high rpm.

According to the embodiment above described, as the upper portion of the column 4 is connected to the front-end portion of the bed 1 through the support 41, even for the structure in which the spindle head 23 embeds the main shaft 23 rotating at high rpm, vibration can be reduced. The column 4 is affected by a force to fall down toward the direction of the force due to the weight of the spindle head but the construction thus formed prevents the tilt caused by the force. Accordingly, a high finish surface accuracy can be ensured without an increase in the size and weight.

The support 41 is composed including a pair of support members 42, 43 which connect through both sides of the front end portion of the bed 1 with both sides of the upper portion of the column 4, so that both sides of the upper portion of the column 4 are supported by the support member 42, 43. Then the strength is much improved. Moreover as the support member 42, 43 are made of hollow cylindrical pipes, the total weight of the machine tool can be reduced.

The space between the pair of the support members 42 and 43 is formed to gradually become wider from the upper portion of the support members toward the lower portion thereof to ensure a working space so that workers can easily handle his work when bringing it to the table 2 or carrying out the work from the table 2.

As a display board 45 is attached on one side of the support member 42, there is no need to prepare an extra stay for the display board. Besides, the display board is arranged in a turnable manner around the axle of the arm 44 so that by turning the display board, bringing in and taking out of works can be easily carried out without any obstacles.

The bed 1 has support portions 1A, 1A to support the lower portion of the pair of support members 42, 43 on the front-end of the bed 1 and a trapezoidal notched portion 1A is provided between the support portions 1A and 1A so that a operator can enter into the notched concavity portion to come near the front of the table 2. Hence the operator can easily carry out the operation even when the above described tasks of bringing in and taking out to or from the table 2.

As the spindle 20 is provided with the main shaft 23 embedded and supported by the air bearing in a rotatable manner, even when the main shaft 23 rotates at high rpm, vibration and noise due to the rotation can be reduced, and the above described effect is improved.

Incidentally, in the above described embodiment, the support 41 are defined by two pieces of the support members 42, 43, it is not limited to two pieces but more than one support member is preferred. And the support member is not limited to a hollow cylindrical pipe, but an angular cylindrical pipe or a solid pipe is also within the scope of the present invention.

In the above described embodiment, the spindle head 20 supporting the main shaft 23 in a rotatable manner by means of the air bearings $22_1$, to $22_3$, is used, but a spindle head supporting the main shaft in a rotatable manner by means of an anti-friction bearing can be used.

Further in the above described embodiment, a vertical machining center is used to explain the present invention, a horizontal machining center can be used to the same advantage.

According to a machine tool according to the present invention, a high finish surface accuracy can be ensured without an increase in size and weight.

What is claimed is:

1. A machine tool having a bed with a table, a column mounted on a first side portion of the bed, a spindle head mounted on the column, said machine tool comprising:
   a support connecting said column with a portion of said bed, said support comprising one or more elongated members extending from said bed portion to engage the column.

2. The machine tool according to claim 1, wherein said support includes a pair of elongated members to respectively connect both sides of the upper portion of said column supporting said spindle head with both sides of a second side portion of said bed.

3. The machine tool according to claim 2, wherein a space between said pair of the elongated members is formed to become gradually wider along the way from both sides of the upper portion of said column supporting said spindle head toward both sides of the second side portion of said bed.

4. The machine tool according to claim 2, wherein said pair of the elongated members are horizontally extended in a manner separating away from each other from both sides of the upper portion of the column supporting said spindle head toward the second side portion of said bed, further horizontally extended in parallel with each other from each front-end toward the second side portion of said bed, and are fixed at right angles on both sides of the second side portion of said bed.

5. The machine tool according to claim 4, wherein said support members are made of pipe.

6. A machine tool having a bed with a table, a column mounted on a first side portion of the bed, a spindle head mounted on the column with a main shaft supported in a rotatable manner by an air bearing, said machine tool comprising:
   a support connecting an upper portion of said column with a second side portion opposite to the first side portion of said bed said support comprising one or more elongated members extending from about the opposing corners of said second side portion to engage the sides of said upper portion of the column.

7. The machine tool according to claim 6, wherein said support includes a pair of elongated members to respectively connect both sides of the upper portion of said column supporting said spindle head with both sides of the second sides portion of said bed.

8. The machine tool according to claim 7, wherein a space between said pair of the elongated members is formed to become gradually wider along the way from both sides of the upper portion of said column supporting said spindle head toward both sides of the upper portion of said column supporting said spindle head toward both sides of the second side portion of said bed.

9. The machine tool according to claim 7, wherein said pair of the elongated members are horizontally extended in a manner separating away from each other from both sides of the upper portion of the column supporting said spindle head toward the second side portion of said bed, further horizontally extended in parallel with each other from each front-end toward the second side portion of said bed and are fixed at right angles on both sides of the second side portion of said bed.

10. The machine tool according to claim 9, wherein said support members are made of pipe.

11. The machine tool according to claim 7, wherein said spindle head is provided with a housing supported by said column, a main shaft embedded and supported by the housing through an air bearing in a rotatable manner and having a flange at about the midpoint thereof, and a motor to rotate the main shaft, and the air bearing being provided with a radial bearing having air outlets jetting out air toward an outer peripheral surface of said main shaft and a thrust bearing having air outlets jetting out air toward the flange of said main shaft.

12. The machine tool according to claim 7, wherein said table is arranged in a movable manner along two directions which intersect at right angles with each other on a horizontal surface and said spindle head is arranged in a movable manner along a vertical direction intersecting at right angles with the moving direction of said table.

13. The machine tool according to claim 12, wherein one side of said support member is provided with an indicator to give positions in the movement of said table in two directions and positions of movement of said spindle head in vertical directions.

14. The machine tool according to claim 13, wherein said indicator is arranged in such a manner that orientation of a display surface can be changed.

15. The machine tool according to claim 7, wherein said bed has support portions to support lower end of said pair of the support members on both sides of the side portion on said bed and provided with a notched concave portion on a space between the supports.

* * * * *